3,536,630
CALCIUM SEQUESTRATION IN HIGHLY ALKALINE MEDIUM
Charles L. Mehltretter, Peoria, Ill., assignor to the United States of America as represented by the Secretary of Agriculture
No Drawing. Filed May 21, 1968, Ser. No. 730,913
Int. Cl. C11d 7/26
U.S. Cl. 252—156     1 Claim

ABSTRACT OF THE DISCLOSURE

Remarkably improved sequestrations of calcium ions in a distinctly alkaline medium, as in the washing of milk bottles, are obtained where the sequestering agent is the known trisodium salt of dihydroxytricarballylic acid.

---

A nonexclusive, irrevocable, royalty-free license in the invention herein described, throughout the world for all purposes of the U.S. Government, with the power to grant sublicenses for such purposes, is hereby granted to the Government of the United States of America.

BACKGROUND OF THE INVENTION

This invention relates to the unobvious discovery that a previously described laboratory curiosity, namely the trisodium salt of dihydroxytricarballylic acid in the presence of alkali is an astonishingly effective calcium sequestering agent, and is far superior in this capability than, for example, sodium citrate which exhibits essentially no sequestering activity in alkaline media or than the sugar acid derivative sodium gluconate which is well known to have good calcium sequestering ability in alkaline media.

Although Pawolleck, Ann. 178:150 (1875) apparently prepared the trisodium salt of dihydroxytricarballylic acid while attempting to convert aconitic acid to citric acid (the reverse derivation of aconitic acid from citric acid being well known), Pawolleck teaches only that aconitic acid on treatment with ammonia failed to sequester ferric ions. Thus, his paper contains no trace of a suggestion that soluble alkali-metal salts of dihydroxytricarballylic acid would exhibit any significant extent of calcium sequestering ability in water and the more so under distinctly alkaline conditions where it is now common knowledge that the related trisodium citrate (monohydroxytricarballylate) has practically no sequestering power for calcium and where the widely used sugar acid derivative, sodium gluconate, exhibits good sequestering power for calcium but far less than that obtained with the soluble alkali salts of dihydroxytricarballylic acid.

The object of the instant invention is the provision of an unobvious process for very efficiently sequestering calcium ions in a distinctly alkaline medium containing, for example, caustic soda, as is ordinarily encountered in the commercial washing of milk, beer, and soft drink glass bottles.

A more specific object is the completely unobvious discovery after nearly a century of uselessness that the employment of 100 grams of the trisodium salt of dihydroxytricarballylic acid as the active agent in a process for sequestering calcium ions at 25° C. from a distinctly alkaline aqueous medium (3% NaOH) effectively sequesters about 29 grams of calcium ion as compared with only 5 grams by the same amount of trisodium citrate (trisodiumhydroxytricarballylate), only 3 grams by trisodium aconitate, and only 14 grams by 100 grams of sodium gluconate. The unpredictability and unobviousness of the above comparisons is rendered more striking by the fact that while the trisodium salt of dihydroxytricarballylic acid contains 2 hydroxyl groups and 3 carboxyl groups, the virtually inoperative trisodium salt of aconitic acid contains 3 carboxyl groups but no hydroxyl groups, and the scarcely better trisodium salt of citric acid (trisodiumhydroxytricarballylate) contains 1 hydroxyl group and 3 carboxyl groups. Inasmuch as the introduction of 1 hydroxyl group to change the aconitate to the citrate makes scarcely any betterment, it could not be surmised or predicted that the addition of a second hydroxyl group to convert the aconitate to dihydroxytricarballylate would provide a roughly 10-fold increase in calcium sequestering power in alkaline solution.

Since applicant synthesizes the trisodiumhydroxyltricarballylate from aconitic acid by substantially the same reactions taught by Pawolleck, i.e., forming the incompletely neutral sodium salt of aconitic acid, chlorohydrinating the salt, and hydrolyzing the chlorohydrinated intermediate, the additional refinements of using chlorine gas instead of hypochlorous acid and of adding 2 equivalents rather than 1 equivalent of NaOH following the chlorohydrination step in order to facilitate the formation of the evanescent and easily hydrolyzable epoxide intermediate is deemed to be noninventive. However, since the applicable prior art teachings of Pawolleck are of such relative antiquity and are in another language, applicants include the following preparative embodiments as a public service.

EXAMPLE 1

Aconitic acid, 80 grams (0.46 moles) was slurried in 1200 ml. water, and 55 grams NaOH (1.37 moles) dissolved in 100 ml. $H_2O$ was added, the resulting pH being 6.9. Chlorine gas, 38 grams (0.54 mole) was introduced into the solution during 90 minutes with constant and external cooling to hold the temperature to 25–30° C. The free $Cl_2$ was vented by aeration, and the pH of the reaction solution was 4.0. The solution was concentrated in vacuo to 750 ml. and by calculation contained 124 grams of disodiumchlorohydroxytricarballylate. A 100-ml. aliquot of the filtered solution containing 16.5 grams of the foregoing intermediate was adjusted to pH 6.9 with 5 N NaOH solution. Then 2.42 grams (1 equivalent) of NaOH was added, and the solution was allowed to stand for 1 hour at ambient temperature to form the unstable epoxide intermediate. Then the solution was heated at ca. 90° C. for 1 hour to decompose the epoxide and form the trisodium salt of dihydroxytricarballylic acid in solution.

To determine the calcium sequestering power of the so produced compound, the foregoing solution was first diluted to 500 ml. with water, and then 60.6 ml. of the 500 ml. was further diluted to 100 ml., thus providing a 2% stock solution of the sequestrant.

A 10 ml. aliquot containing 0.2 grams of trisodiumdihydroxytricarballylate was placed in a 50 ml. beaker equipped with a magnetic stirrer. Following the addition of 10 ml. of 6% NaOH solution and 2 ml. of 2% sodium oxalate solution, the mixture was titrated to the first appearance of permanent turbidity with 1% calcium acetate solution, which in this instance amounted to a calcium content of 0.058 gram equivalent to the sequestration of 29 grams of calcium per 100 grams of the sequestrant. The previously alluded to comparison results were obtained using precisely the same test procedure.

I claim:
1. A process for sequestering about 29 grams of dissolved calcium ions in a water solution also containing about 3 percent by weight of dissolved sodium hydroxide comprising adding and dissolving therein 100 grams of the trisodium salt of dihydroxytricarballylic acid.

References Cited

"Preparation, physiological behavior and importance of hydroxy-citric acid and its isomers," Chemical Abstracts, vol. 36 (1942), col. 6141[7].

Pawolleck: "Justus Liebigs Annalen der Chemie," (1875), 178:150.

LEON D. ROSDOL, Primary Examiner

A. RADY, Assistant Examiner

U.S. Cl. X.R.

260—535